(12) United States Patent  
Marland

(10) Patent No.: US 6,292,567 B1  
(45) Date of Patent: Sep. 18, 2001

(54) SYNC SUPPRESSION TELEVISION SECURITY SYSTEM WITH ADDRESSABLE SYNC RESTORATION

(75) Inventor: Dale W. Marland, Erieville, NY (US)

(73) Assignee: Eagle Comtronics, Inc., Clay, NY (US)

( * ) Notice: Subject to any disclaimer, the term of this patent is extended or adjusted under 35 U.S.C. 154(b) by 0 days.

(21) Appl. No.: 09/140,400

(22) Filed: Aug. 26, 1998

Related U.S. Application Data

(60) Provisional application No. 60/056,407, filed on Aug. 26, 1997.

(51) Int. Cl.[7] ............................................. H04N 7/167
(52) U.S. Cl. ........................ 380/208; 380/221; 380/223
(58) Field of Search .................... 380/208, 221, 380/223

(56) References Cited

U.S. PATENT DOCUMENTS

| | | | |
|---|---|---|---|
| 3,333,052 | * 7/1967 | Kahn | 380/221 |
| 4,330,794 | * 5/1982 | Sherwood | 380/206 |
| 4,706,285 | * 11/1987 | Rumreich | 380/221 |
| 4,928,309 | * 5/1990 | White | 380/221 |

\* cited by examiner

*Primary Examiner*—Gilberto Barron, Jr.
(74) *Attorney, Agent, or Firm*—Burr & Brown

(57) ABSTRACT

A television transmission security system, including scrambling a television signal by suppressing at least one of the horizontal sync pulse and vertical blanking interval of the television signal; transmitting the scrambled television signal; generating, and separately transmitting along with the scrambled television signal, a pilot carrier that includes timing information corresponding to the horizontal sync pulse and/or vertical blanking interval; and descrambling the scrambled television signal including receiving the pilot carrier and periodically suppressing, in accordance with the timing information included in the pilot carrier, video information of the television signal to an extent whereby at least one of the horizontal sync pulse and vertical blanking interval becomes detectable by a television receiver, thereby initiating organized receipt and display of the television signal. In addition to the sync suppression scrambling device and method, a sync restoration descrambling device, and the method it performs, are disclosed.

23 Claims, 10 Drawing Sheets

CARRIER SIGNAL AMPLITUDE VS. TIME

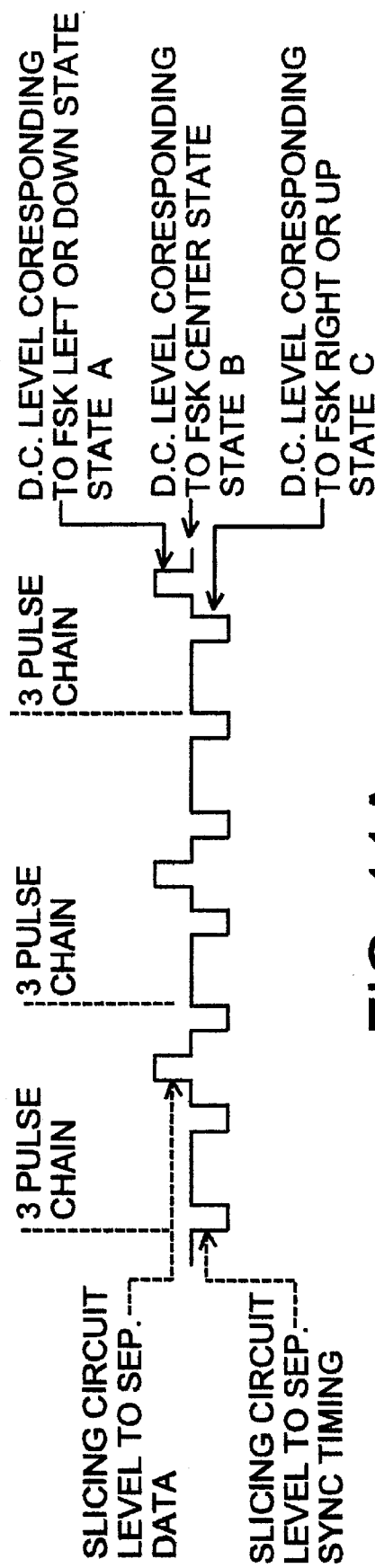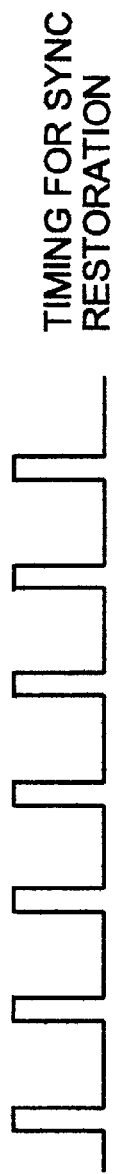
FIG. 11A
FIG. 11B
FIG. 11C

SYNC SUPPRESSION TELEVISION SECURITY SYSTEM WITH ADDRESSABLE SYNC RESTORATION

CROSS-REFERENCE TO RELATED APPLICATION

This regular U.S. patent application claims the benefit of U.S. provisional patent application Ser. No. 60/056,407, filed Aug. 26, 1997, the entire disclosure of which is incorporated by reference into the present application.

The present invention is directed to a television security system for cable television wherein television channels are scrambled by suppressing the horizontal and/or vertical synchronizing pulses and are descrambled by a frequency selective attenuator located in the vicinity of a subscriber.

BACKGROUND OF THE INVENTION

In cable television it is desirable sometimes to scramble or block certain "premium" channels or pay-per-view channels so that only cable television subscribers who have made payment specifically for those services can have access thereto. It sometimes is also desirable to control subscriber access to all channels carried by a cable system.

One cable television scrambling or blocking method was disclosed in Tanner U.S. Pat. No. 4,074,311. Tanner disclosed injecting between the visual and aural carriers of a television signal a high amplitude signal which prevents a television tuner from locking onto the necessary sync pulses to properly arrange on a television screen the video information transmitted with the television signal. The scrambling method in accordance with Tanner, however, requires that each channel be jammed with an injected signal and that a "descrambling" notch filter be provided for each channel at the subscriber end of the system. Thus, multiple notch filters are required at the subscriber end and it is difficult, if not impossible, to provide subscribers real-time service changes such as in response to an on-demand pay-per-view request.

Another type of television channel scrambling known in the prior art is synchronization suppression, hereinafter sync suppression. In prior art systems implementing sync suppression, the sync restoration or timing information is typically carried by and keyed from the aural carrier of, for example, any of channels 2, 3, or 4. Thus, in prior art sync suppression scrambling systems, it was relatively easy for a cable "pirate" illegally to obtain the scrambled channels, since one could easily detect the required sync information.

Such prior art systems typically include the descrambling system in a "converter" which historically was a box connected between a customer's incoming cable line and the television receiver, for converting the cable transmitted signal for use by a standard television receiver "set." Such converter/descrambler systems are undesirable because only one channel may be viewed at a time because the converter/descrambler decodes the channels only after they are converted. And because they have the ability to decode only one channel at a time, a separate converter/descrambler is required for each television set in the home that requires CATV service.

In view of the deficiencies in prior art cable television scrambling systems, it is still desirable to have a cable television scrambling system that can effectively scramble individual television channels with reduced concern of pirating and for which there can be real-time subscriber access control.

It is therefore an object of the present invention to provide a television security system employing sync suppression with remotely addressable sync restoration.

It is another object of the present invention to provide a television scrambling system requiring only one descrambling unit able to service multiple television sets per subscriber location.

It is a further object of the present invention to provide a simple device that can be easily installed at the subscriber's location.

It is also an object of the present invention to provide a television scrambling system and descrambler that is "user friendly" with respect to VCR and remote control units and is compatible with loop or home-operated wired systems.

It is a further object of the present invention to be able to implement other sync suppression scrambling methods in conjunction with the system of the present invention.

It is still another object of the present invention to provide a service disconnect feature by which the cable system operator may disconnect the entire spectrum of cable channels from any individual subscriber as an addressable feature to require payment of late fees before continuing service will be restored.

SUMMARY OF THE INVENTION

The foregoing objects and others are achieved by the television transmission security system of the present invention which includes:

- means for scrambling a television signal by suppressing at least one of the horizontal sync pulse and vertical blanking interval of the television signal;
- means for transmitting the scrambled television signal;
- means for generating, and separately transmitting along with the scrambled television signal, a pilot carrier that includes timing information corresponding to the horizontal sync pulse and/or vertical blanking interval; and
- means for descrambling the scrambled television signal including means for receiving the pilot carrier and means for periodically suppressing, in accordance with the timing information included in the pilot carrier, video information of the television signal to an extent whereby at least one of the horizontal sync pulse and vertical blanking interval becomes detectable by a television receiver, thereby initiating organized receipt and display of the television signal.

In addition to the sync suppression scrambling device and method, a sync restoration descrambling device, and the method it performs, are also important aspects of the system of the present invention.

BRIEF DESCRIPTION OF THE DRAWINGS

The different objects and characteristics of the present invention will appear in greater detail in the following description made by way of example and with reference to the appended figures, of which:

FIG. 11A graphically illustrates a typical waveform that would be demodulated by the FSK receiver when presented a three-state (tri-state) FSK signal, and FIGS. 11B and 11C separately illustrate an addressing data signal, and sync restoration timing signal, respectively, separated from the FIG. 11A waveform.

DETAILED DESCRIPTION OF THE INVENTION

Figure 1:
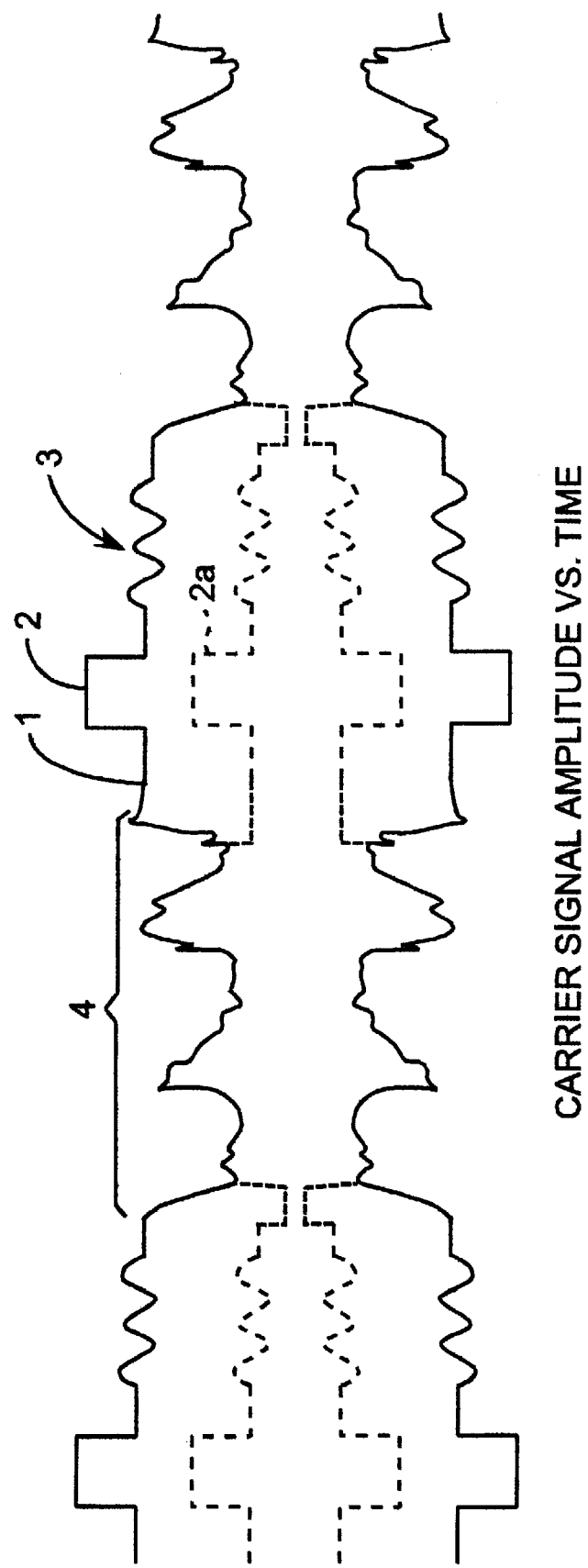
FIG. 1 graphically depicts an exemplary envelope amplitude modulated television carrier signal illustrated in its normal and sync suppressed states.

Scrambling a television signal by suppressing the sync information carried by a television signal is shown in FIG. 1. In a non-suppressed situation, the front porch 1 of a television signal is followed by sync tip 2 and back porch with color burst 3. Sequentially thereafter, the video information that makes up the picture to be displayed on a television screen is transmitted as signal portion 4. As shown in FIG. 1, a non-suppressed sync tip has an amplitude greater than all other amplitudes in the transmitted signal. To scramble a television signal via sync suppression, the sync information is selectively suppressed as shown by dotted lines 2a whereby that information is effectively hidden within the peak-to-peak variations of the video information. Effective suppression is achieved when the sync information is suppressed by about 6 dB. Once the sync information is suppressed or attenuated, it is preferable to amplify the entire transmitted signal to bring the peak-to-peak video signal to a level comparable with the amplitude level of peak-to-peak non-suppressed sync pulses.

Figure 2:
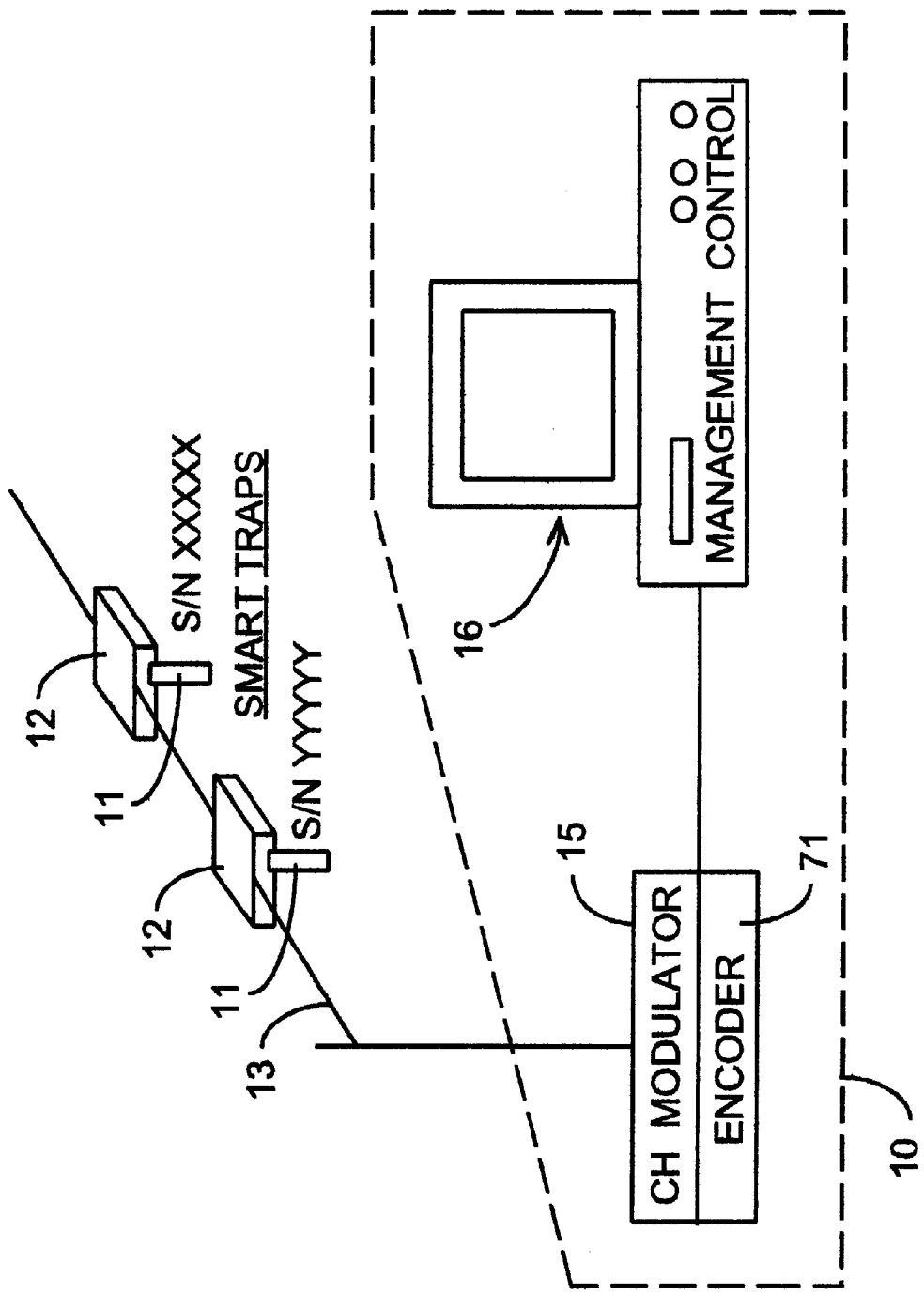
FIG. 2 shows an overall system diagram of the present invention.

FIG. 2 shows a cable transmission system in accordance with the present invention. Headend 10 includes encoder 71 and modulator 15 along with a computerized management control system 16, both of which are explained in more detail later herein. Generally however, encoder 71/modulator 15 and management control system 16 are used to implement sync suppression and transmit, along with the television signal, a separate pilot carrier that includes sync restoration timing information and unique addressing information, all of which are used to enable selectively individual descramblers at the subscriber end of a cable system.

The sync restoration devices 11 of the present invention are connected to taps 12 which are themselves connected to a cable distribution line 13 which carries both scrambled and non-scrambled television signals.

Figure 3:
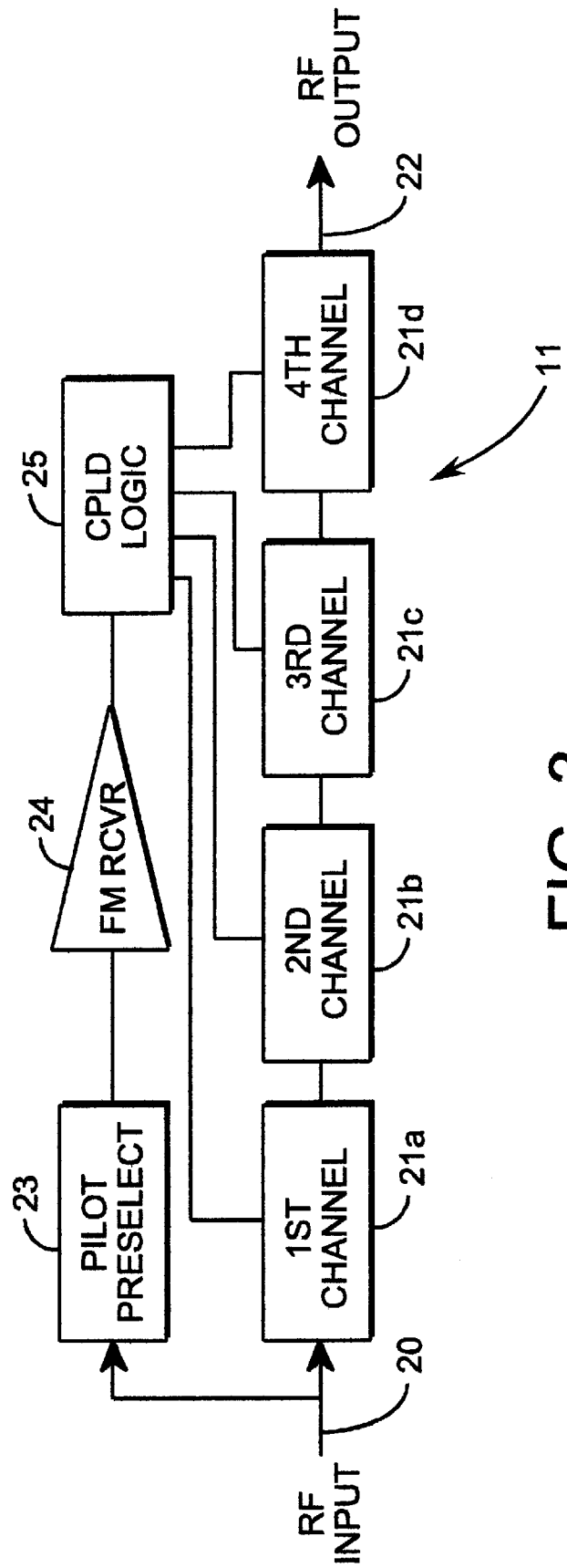
FIG. 3 is a block diagram of the sync restoration device of the present invention.

FIG. 3 depicts a sync restoration device 11 of the present invention. Sync restoration device 11 includes an RF input 20 connected to, for example, four series-connected selectively tunable notch filters or frequency selective attenuators 21a–21d, each tuned to a different channel. RF output 22 passes all RF signals input from RF input 20. In practice, the RF input to the sync restoration device 11 includes the entire broadcast spectrum containing suppressed sync channels, standard non-scrambled channels, the sync restoration information pilot carrier and like signals. RF input 20 delivers those signals to both a pilot carrier pre-selection filter 23 and the series of frequency selective attenuators 21a–21d. The pre-selection filter 23 is preferably a bandpass filter which presents the pilot carrier to, for example, an FM receiver which demodulates the pilot carrier into the sync restoration information necessary to descramble the sync suppressed/scrambled television signals and presents the sync restoration information to a complex programmable logic device (CPLD) 25 which determines which of the frequency selective attenuators 21a–21d ought to be active, thereby descrambling the channel to which it is tuned. The CPLD 25 may be programmable or addressable with the use of a microprocessor.

Figure 4:
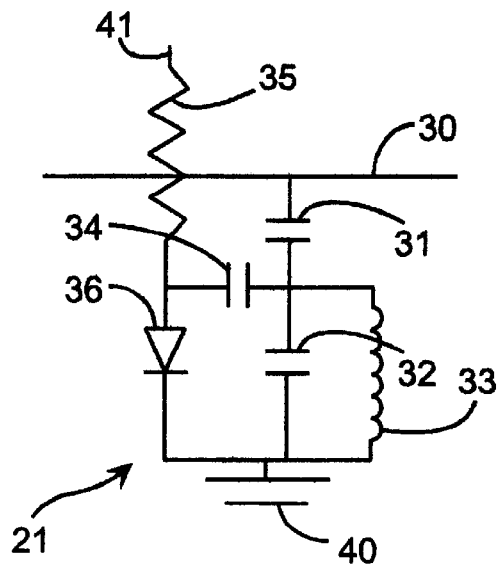
FIG. 4 shows a tunable notch filter circuit in accordance with the present invention.
Figure 5:
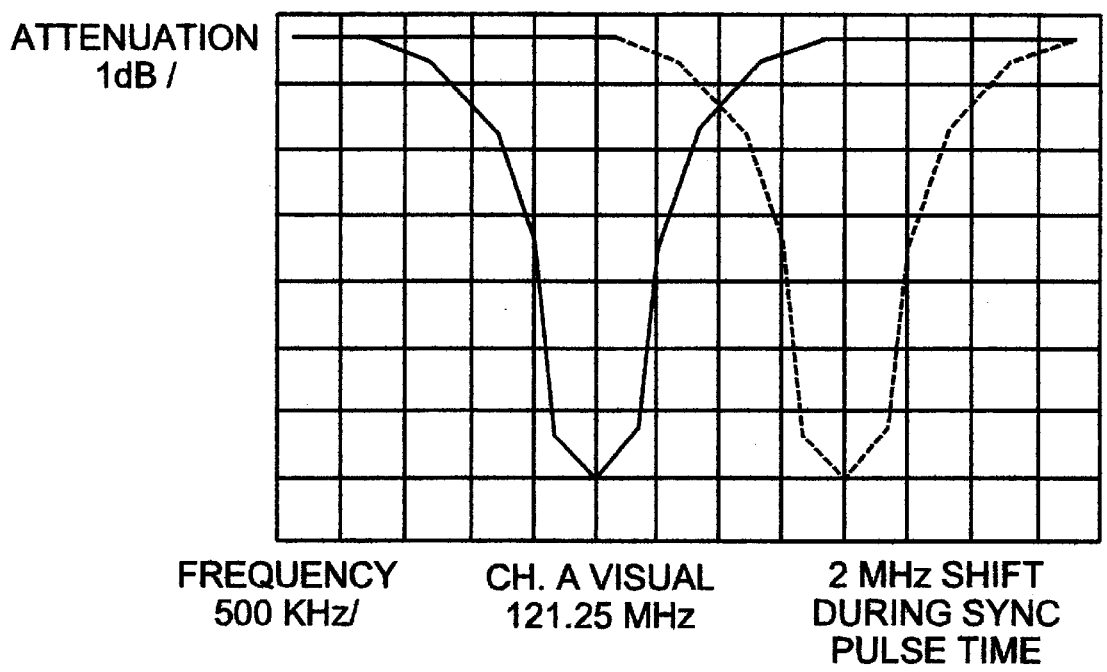
FIG. 5 shows the shift of the center frequency of the notch produced by the circuit of FIG. 4.

FIGS. 4 and 5 provide a more detailed explanation of how the sync restoration device 11 of the present invention operates. Each frequency selective attenuator 21a–21d comprises certain components and three signal sources: capacitors 31, 32, 34, resistor 35, diode 36, inductor 33, RF throughpath 30, and RF ground 40. Sync restoration information is provided at 41 from CPLD 25. Capacitor 31 is a small capacitor coupling energy into the resonant tank circuit formed by capacitor 32 and inductor 33. The values of capacitors 31 and 32 along with inductor 33 are selected to generate a notch in signals passing in the RF throughpath with approximately the same signal amplitude loss as the amount of sync suppression supplied at the headend scrambler, namely about 6 dB, and a center frequency about 2 MHz above the frequency of the video carrier of the scrambled channel.

Capacitor 34 is then alternated between two states by diode 36 in response to the sync restoration signal 41 input through resistor 35. That is, capacitor 34 is switched in and out of the resonant tank formed by capacitor 32 and inductor 33. When switched into the tank circuit, capacitor 34 shifts the resonant frequency lower by approximately 2 MHz. This results in the notch imposed upon signals in the RF throughpath being shifted lower to coincide with the visual carrier frequency of the scrambled channel. If the timing of this shift occurs only over the interval corresponding to the region of the television signal not suppressed in the headend for scrambling of the channel, and the depth of the attenuation is equal to the amount of attenuation supplied over the sync intervals for scrambling at the headend scrambler, the two intervals, i.e., the video information and sync information, will return to the correct amplitude relative to one another. This results in a descrambled channel in a format that may be viewed on a standard television receiver. A plurality of frequency selective attenuators 21 may be cascaded from the RF throughpath to generate a multiple channel descrambling network as long as the channels share a common timing relationships for their sync intervals, or there is a separate pilot carrier receiver and selection network for each channel or group of channels whose sync intervals are not common.

The nature of the frequency selective attenuators 21 permits all other frequencies to be passed through unaffected. This permits the network to be placed off premises, if desired, thereby providing increased security. This also means that all channels may be presented simultaneously to all of a subscriber's video devices, i.e., multiple television sets as well as one or more VCR's.

Figure 6:
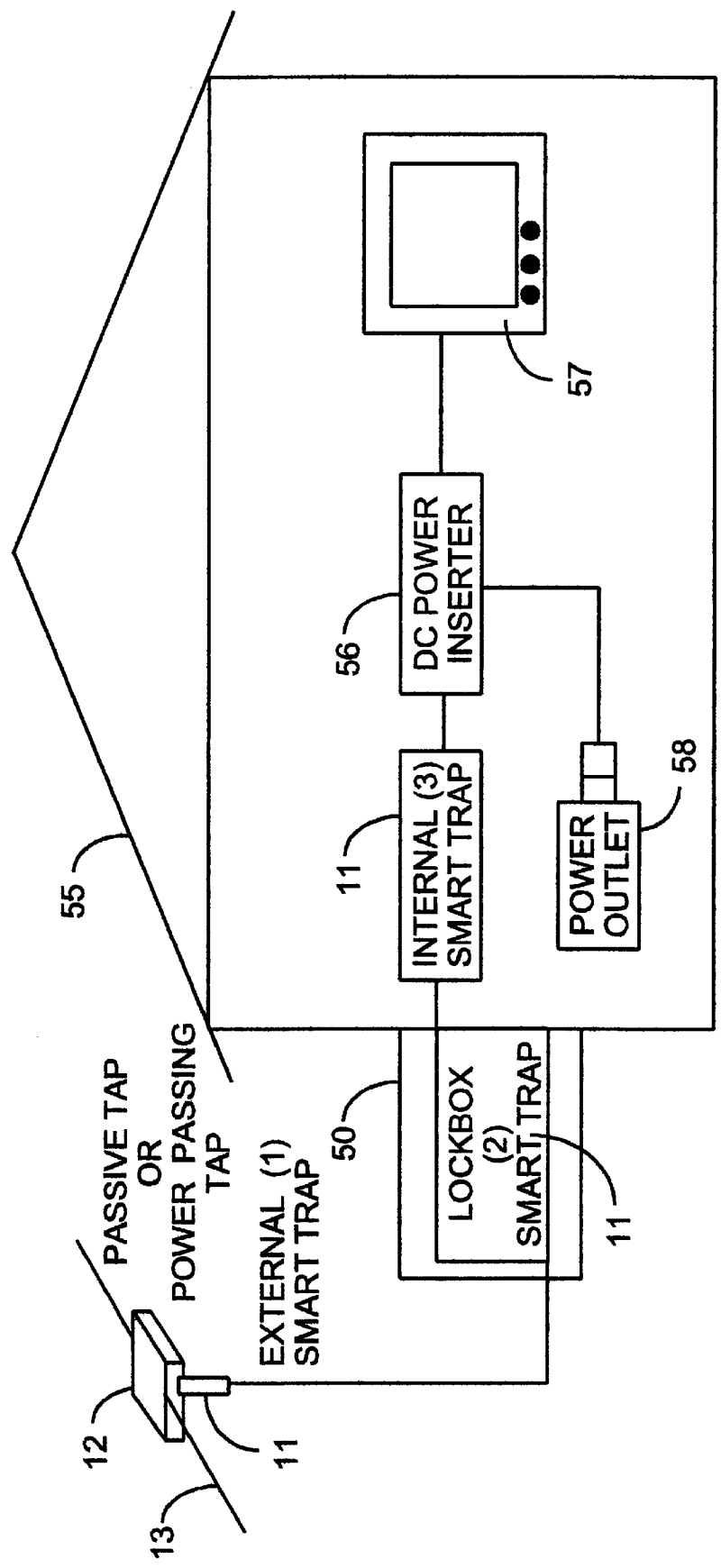
FIG. 6 shows possible positions for locating the sync restoration device of the present invention.

The sync restoration device 11 of the present invention might typically be located in one of at least three general areas at a subscriber's end of the cable system. As shown in FIG. 6, the sync restoration device 11 may be connected (1)

directly to tap 12, be located (2) inside a lock box 50 adjacent a subscriber dwelling 55, or be installed (3) inside dwelling 55. The CPLD 25 of the present invention is an active device and requires DC power. Such DC power can be applied to the sync restoration device 11 via a power passing-type tap 12 or via a DC power inserter 56 inserted between, for example, television receiver 57 and sync restoration device 11. The DC power inserter 56 can be powered by a conventional AC power outlet 58 in the subscriber's dwelling 55. Thus, the sync restoration device 11 of the present invention is versatile in that its location at the subscriber's end of the cable system can be changed depending on the particular circumstances and level of security desired by a cable system operator.

Figure 7:
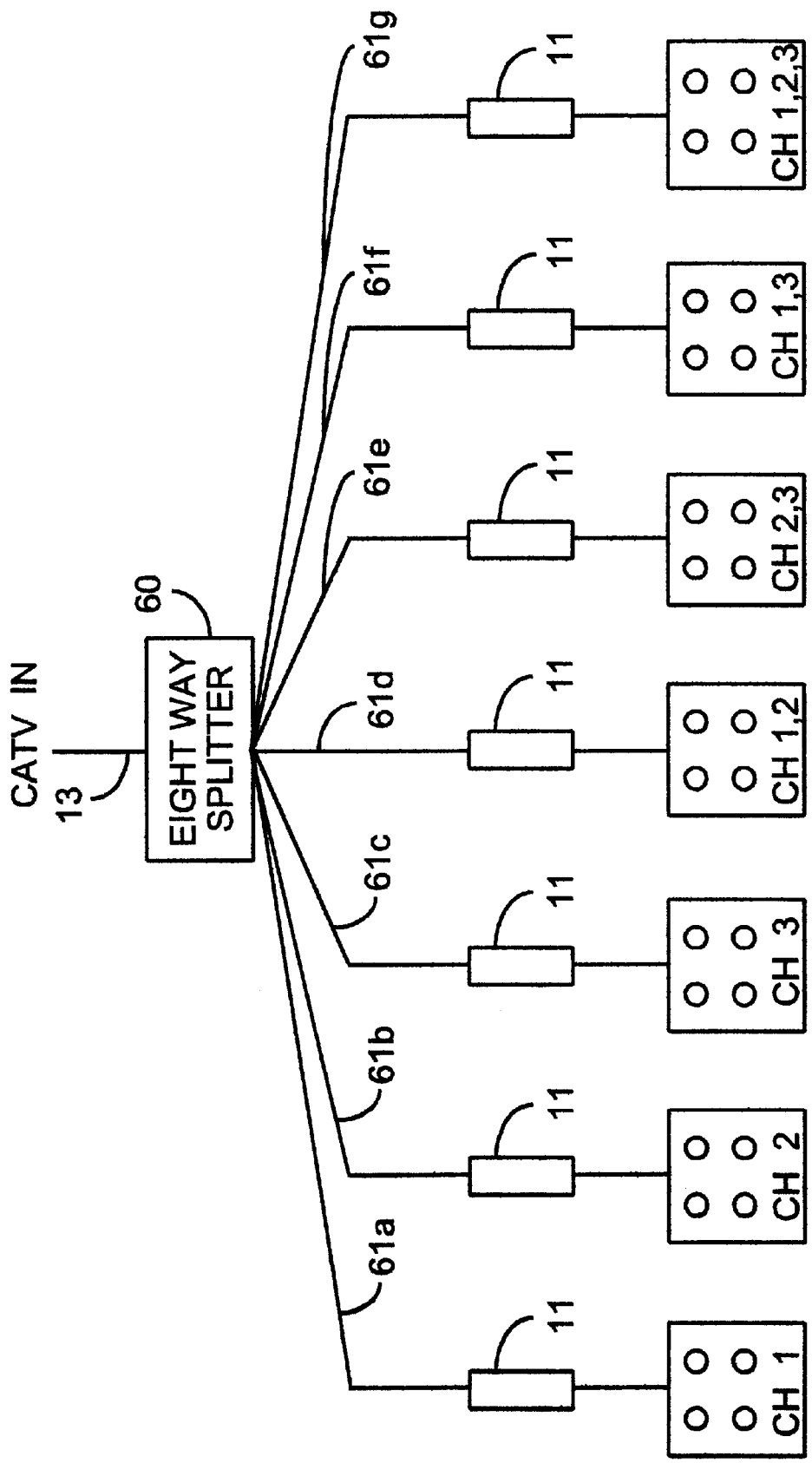
FIG. 7 shows how a plurality of sync restoration devices of the present invention can be employed.

FIG. 7 depicts how a single cable distribution line can be split by, for example, an 8-way splitter 60 whereby each branch can be fitted with a sync restoration device 11 and different combinations of channel access can be provided for each branch. This functionality is made possible by the addressable nature of each sync restoration device 11.

Figure 8:
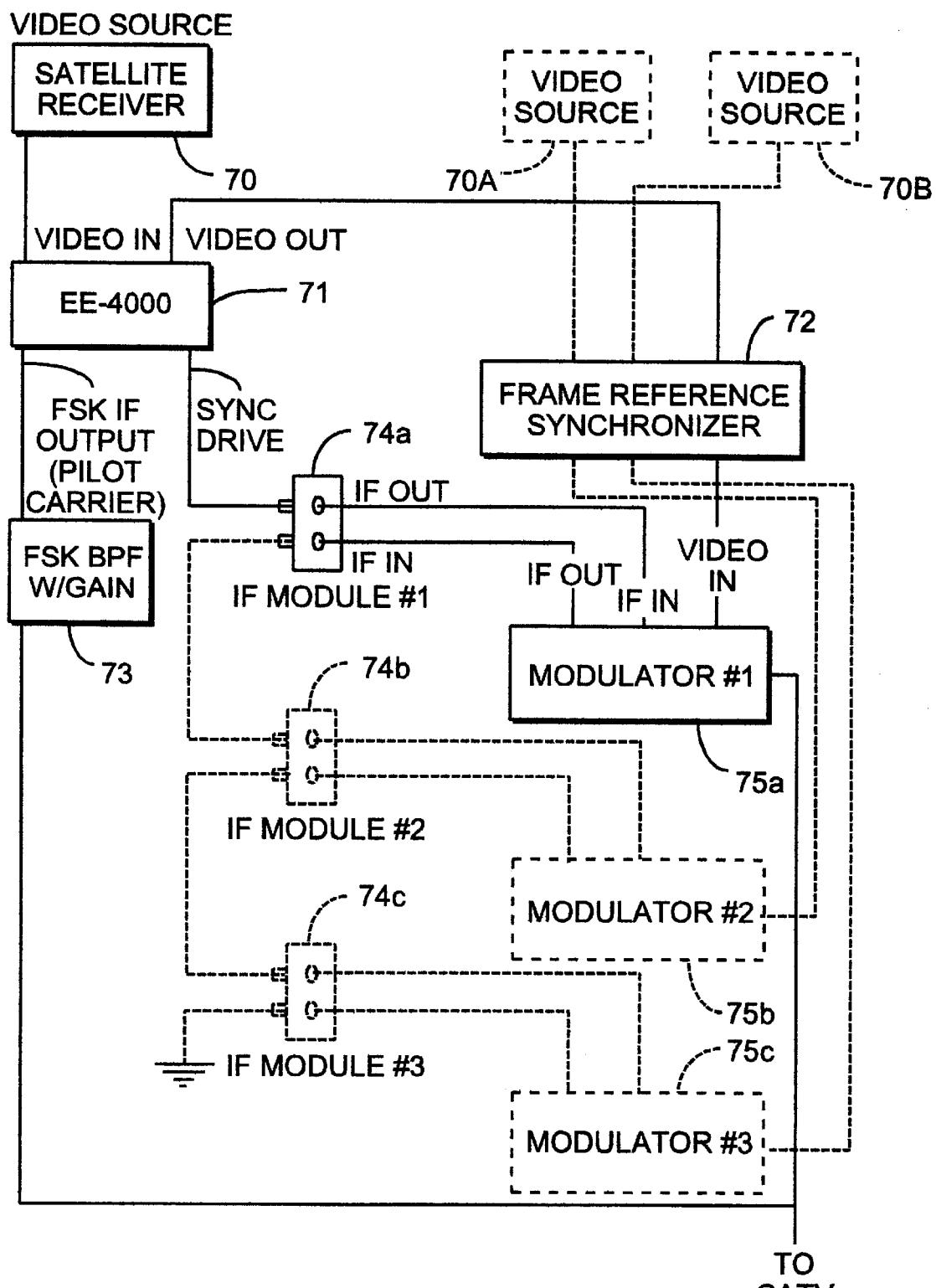
FIG. 8 depicts a headend arrangement in accordance with the present invention.

The following is a description of a preferable arrangement for a headend of a cable system in accordance with the present invention. FIG. 8 depicts such a preferable arrangement. Receiver 70 usually will be a satellite receiver but it may be any video source, i.e., satellite receiver, laser disc player, VCR, etc., for the channel to be encoded. This video source loops through an encoder 71, such as an Eagle Encoder EE-4001, where the synchronizing signals for the channel are separated and used to suppress the sync and generate the FSK pilot. This video then loops through the master reference of a frame synchronizer 72 and to the modulator 75A for the channel. The frame synchronizer also samples the video's sync signals and then insures that any other video sources, 70A and/or 70B, that are looped through slave sections of the frame synchronizer are locked in time to the master video source 70, which is looped through the encoder. These other video sources then drive other modulators 75B and 75C for encoded channels. This diagram is limited to three encoded channels, but the application is basically unlimited in the number of channels it may control.

Each modulator to be encoded has an IF sync suppression loop module 74A, B, C which may be driven in daisy chain fashion from the encoder 71. Each module contains a diode switch which attenuates the video IF passband of the channel over every sync interval suppressing it by a minimum of 4 dB thereby scrambling the signal. Because all of the channels to be encoded are synchronized in time to one another, the single sync drive signal from the encoder can be used to scramble them all. The encoder also contains a frequency synthesizer that is utilized to generate a three-state (tri-state) FSK signal. FSKI bandpass filter 73 with gain control may be contained within the encoder 71. The diagram shows that the RF outputs of all the modulators are combined with the FSK output (pilot carrier) and sent out over the CATV system together with all of the other signals.

Figure 9:
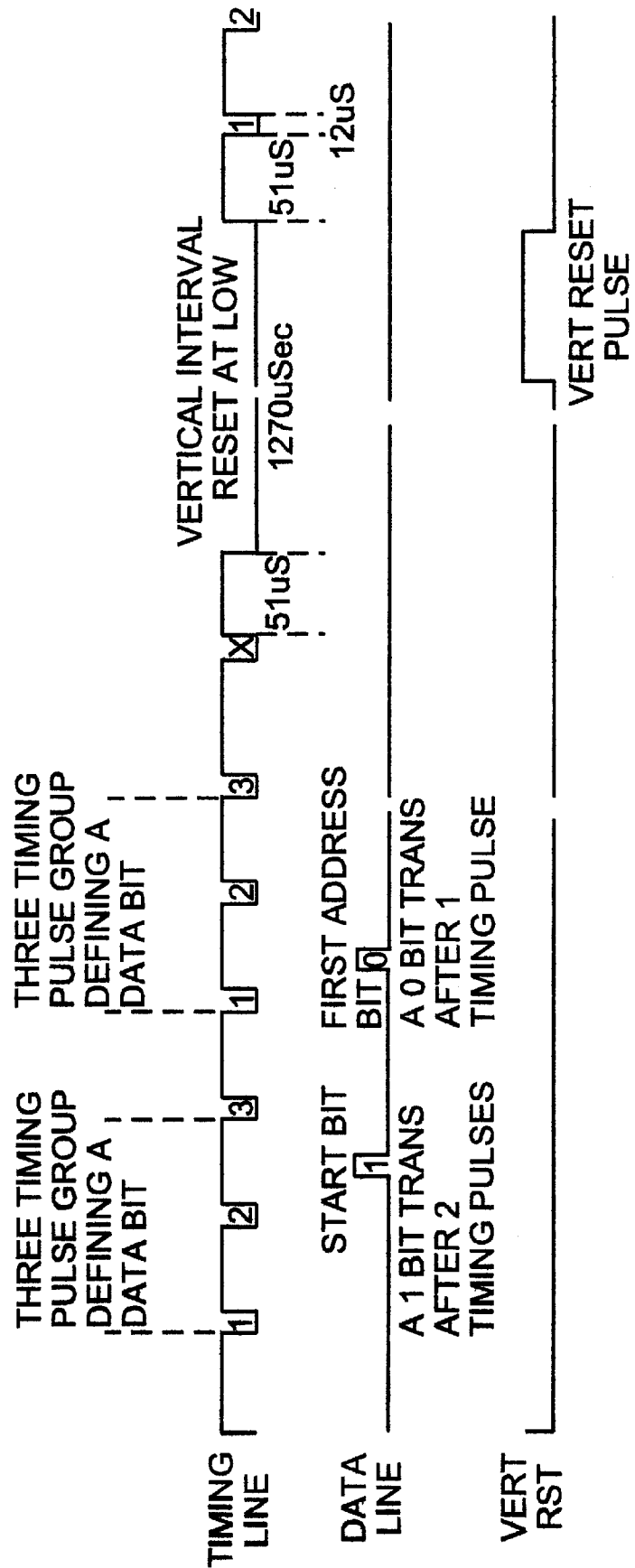
FIG. 9 shows the timing relationship of the sync restoration pulses and the addressing data.

FIG. 9 shows the timing relationship of the sync restoration pulses and the addressing data. The timing line depicts the pulses that would tell the decoding portions of the present invention when the decoding notch should be shifted into the higher frequency slot, restoring the sync amplitude. This timing line also shows the vertical blanking interval as a block that requires the decoding notch in the higher frequency slot over its entire duration to restore the block as a whole to its original amplitude. The data line shows how a transition from low to high may be used to convey a data bit "1" or "0" depending upon its position in a reference pulse train, i.e., timing line. The timing pulses are broken into groups of three. If a data transition occurs after one pulse, it is considered a "0"; if it occurs after two timing pulses, it is considered a "1". It is the pulse's position within the chain of timing pulses that is important. The Vert Rst line depicts that a reset pulse is generated within the CPLD circuitry.

Figure 10:
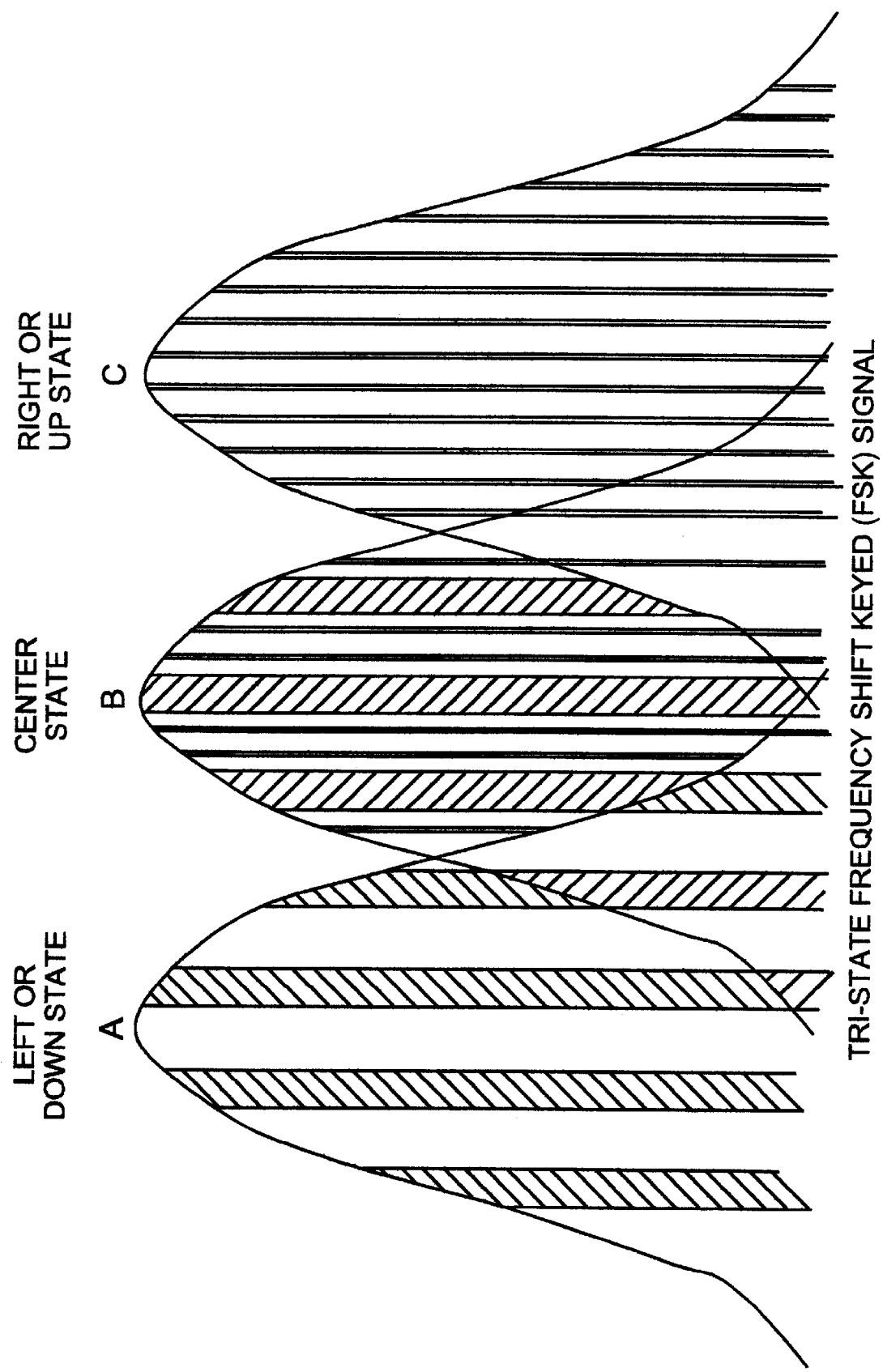
FIG. 10 graphically illustrates three states of (tri-state) frequency shift keyed (FSK) operation of the present invention.

FIG. 10 depicts the tri-state FSK carrier in appearance and FIGS. 11A, B and C, respectively, depict the data and timing relationships to each other within that carrier. FIG. 10 depicts the FSK signal as it would appear when viewed with a spectrum analyzer, each of the individual "humps" represents the location in frequency to which the carrier would be shifted relative to the data or timing pulses required to be transmitted. The center state B is the idle state. The carrier shifts left to a lower frequency state A to transmit a given data transition. The carrier shifts to the right to a higher frequency state C to transmit a timing pulse. As thus illustrated, the carrier is centered at only one frequency at a time.

FIG. 11A is a representation of a typical waveform that would be demodulated by the FSK receiver when presented the tri-state FSK signal. FIGS. 11B and C illustrate two signals separated from the FIG. 11A waveform.

The billing computer or resident PC will download 24 bit words into first-in first-out (FIFO) memory registers, which are within an encoder 71 such as an EE-4001. The FIFO then one at a time present these words to parallel in serial out registers which, in concert with the vertical and horizontal timing of the master video, shift each bit of the word out to the FSK generator. The first bit is always a binary one and is aptly called the Start Bit. The next 17 bits of binary ones and zeros constitute the unique address, one of 131,072 (128K) that has been programmed into the CPLD that resides in the inventive device which is monitoring the address data stream. When the CPLD matches the 17 address bits with its internal address, it accepts the next six bits of transmitted information as the intended service level. The first five bits control which channels are allowed to be decoded and the sixth runs the all service switch to allow complete disconnect of the entire cable spectrum from the subscriber. Each 24 bit word (1-Start, 17-address, 6-control) consumes one-third of a field. Three complete transactions occur each field, 60 fields per second, 180 transactions per second, 10,800 per minute. If all 128K units were in one system it would take approximately 12 minutes to address every one.

Returning to the shift registers, as each bit is shifted out the circuitry senses if it is a one or a zero and places a data transition pulse in the appropriate position, so-called pulse position weighting. If it is a one, the data transition occurs after two timing pulses have occurred in a three pulse chain. If it is a zero, the data transition occurs after one timing pulse of a three pulse chain. The entire address and timing structure is scaleable in almost any direction, more timing pulses could be allowed as a chain and the pulse position could be after four is a one and after eight is a zero, etc. There could be 36 bits to a word, expanding the address base and/or the controllable channels.

The inventive device accepts the incoming tri-state FSK and demodulates it into the waveform shown in FIG. 11A. Each DC level corresponds to one of the states of the transmitter, a positive and negative peak tracking circuit finds the most positive and most negative voltages of the waveform and develops the slicing or threshold levels shown on the drawing. FIGS. 11B and 11C show the data and timing signals, respectively, extracted from the FIG. 11A waveform. The CPLD accepts these signals and decodes the pulse position data by counting the number of timing pulses in a three pulse chain before it witnesses a data transition. In this way it serially shifts each incoming bit into a 24 bit long shift register. When the 24th bit is shifted in, the Start Bit (always a one) authorizes a comparison of the next 17 registers with the internally programmed address. If a match is found, the last 6 registers are latched into storage for identifying the allowed service levels until an address match occurs again. This communication process is quite advantageous and desirable because it is self-clocking and does not require an on-board oscillator to function. The timing pulses are then used to decode the channels that have been authorized by shifting the notch from the video carrier at the time when sync is present.

The address data that is transmitted in the pilot carrier is stored in any well-known computer database that is operable on a computer that functions as management control 16. FOXPro™ is one software database application that may be implemented and which can sort data based on subscriber name, postal zone, or serial number in ascending or descending order, in subsets, or in accordance with various other queries. Such a database application is operable with Windows 95 or Windows 3.1. Of course, any other database application operating in any other known operating system can provide the required address data and management control. As shown in FIG. 2, management control 16 is connected to modulator 15/encoder 71 whereby the address data managed and stored in management control 16 is provided as required.

In a preferred embodiment, the 24 bit data addresses are batch transferred from a FOXPro™ database and stored in FIFO buffers within the encoder 71. The stored data is continuously cycled at 5.25 kbps, 10,800 subs/minute, until a new data set is transmitted to the encoder 71.

As previously explained, the CPLD 25 uses 17 of the 24 bits for address identification, which permits a total of 128,000 subscribers per data carrier. Of course, additional subscribers can be added using an additional pilot carrier or more bits designated as address bits.

In accordance with the present invention, it is possible effectively to manage and control subscriber access on a channel-per-channel and real-time basis. Moreover, the present invention provides superior anti-pirating protection. By utilizing a separate pilot carrier, the potential pirate must decipher the pilot carrier transmission, recreate a new timing scheme, replace the entire receive and decode network, and re-present the pirated channels to the television receiver. In other words, the potential pirate must invent an addressable converter specifically designed to steal a sync suppressed scrambled channel in accordance with the present invention. While such an endeavor is feasible, it is far more complicated than the schemes presently used to steal signals from known addressable television receiver-top converter boxes.

While the present invention has been shown and described with reference to the foregoing preferred embodiments, it will be apparent to those skilled in the art that other changes in form and detail may be made therein without departing from the spirit and scope of the invention as defined in the appended claims.

What is claimed is:

1. A television transmission system, comprising:

means for scrambling a television signal by suppressing at least one of the horizontal sync pulse and vertical blanking interval of the television signal;

means for transmitting the scrambled television signal;

means for generating, and separately transmitting along with the scrambled television signal, a pilot carrier that includes timing information corresponding to said at least one of the horizontal sync pulse and vertical blanking interval; and means for descrambling the scrambled television signal including means for receiving the pilot carrier and means for periodically suppressing, in accordance with the timing information included in the pilot carrier, video information of the television signal to an extent whereby said at least one of the horizontal sync pulse and vertical blanking interval becomes detectable by a television receiver;

wherein said means for descrambling comprises a frequency selective notch filter in electrical communication with an RF throughpath, and means for moving the center frequency of said notch filter.

2. The system of claim 1, wherein one of said means for scrambling and transmitting amplifies the scrambled television signal such that the video information has a peak amplitude comparable to said at least one of the horizontal sync pulse and vertical blanking interval prior to being suppressed.

3. The system of claim 1 wherein the means for suppressing suppresses the amplitude of said at least one of the horizontal sync pulse and vertical blanking interval by about 6 dB.

4. The system of claim 1 wherein the means for suppressing and transmitting is located at a headend of a cable television system.

5. The system of claim 1 wherein said means for descrambling is located at a subscriber end of a cable television system.

6. The system of claim 1 wherein said means for descrambling comprises at least one frequency selective attenuator.

7. The system of claim 1 wherein said means for descrambling comprises a plurality of frequency selective attenuators.

8. The system of claim 7 wherein said means for descrambling comprises a pilot carrier pre-selection filter, a receiver for demodulating a pilot carrier output by said pre-selection filter and a switching network.

9. The system of claim 8 wherein the switching network is a complex programmable logic device.

10. The system of claim 8 wherein said switching network is capable of activating, based on unique addressing information included in a pilot carrier, at least one of the plurality of frequency selective attenuators thereby descrambling a scrambled television channel signal.

11. The system of claim 7 wherein each of the frequency selective attenuators is tuned to a different scrambled television channel.

12. The system of claim 11, wherein the switching network is capable of initiating a frequency shift to a center frequency of a notch filter of one of the frequency selective attenuators whereby the shifted center frequency overlaps with the frequency of the video information of the television signal, said frequency shift being coincident with timing of the suppression of said at least one of the horizontal sync pulse and vertical blanking interval, consistent with the timing information carried by the pilot carrier.

13. The system of claim 1, wherein said frequency selective notch filter comprises a resonant tank circuit connected in series with a coupling capacitor between the RF throughpath and ground;

a means for switching; and a capacitor, wherein said capacitor is connected in parallel with said resonant tank circuit only when said means for switching is on.

14. The system of claim 13, wherein when said means for switching is on, the center frequency of said frequency selective notch filter is decreased by about 2 MHz.

15. The system of claim 13, wherein said means for switching comprises a resistor and a diode.

16. The system of claim 1, wherein said means for descrambling is uniquely addressable via address information carried by said pilot carrier.

17. The system of claim 1 further comprising a management control system for managing and storing address information for uniquely addressing a plurality of said means for descrambling.

18. A television scrambling and descrambling method, comprising the steps of:

scrambling a television signal by suppressing at least one of the horizontal sync pulse and vertical blanking interval of the television signal;

transmitting the scrambled television signal;

generating, and separately transmitting along with the scrambled television signal, a pilot carrier that includes timing information corresponding to said at least one of the horizontal sync pulse and vertical blanking interval; and descrambling the scrambled television signal including receiving the pilot carrier and periodically suppressing, in accordance with the timing information included in the pilot carrier, video information of the television signal to an extent whereby said at least one of the horizontal sync pulse and vertical blanking interval becomes detectable by a television receiver for initiating receipt and display of the television signal;

wherein said descrambling further comprises initiating a frequency shift to a center frequency of a notch filter of a frequency selective attenuator whereby the shifted center frequency overlaps with the frequency of the video information of the television signal, said frequency shift being coincident with timing of the suppression of said at least one of the horizontal sync pulse and vertical blanking interval, which timing is carried by the pilot carrier.

19. The method of claim 18, wherein one of suppressing and transmitting amplifies the scrambled television signal such that the video information has a peak amplitude comparable to at least one of the horizontal sync pulse and vertical blanking interval prior to being suppressed.

20. The system of claim 18 including suppressing at least one of the horizontal sync pulse and vertical blanking interval by about 6 dB.

21. A television signal restoration device for use with a sync suppression scrambling system, wherein said device comprises a frequency selective notch filter comprising a resonant tank circuit connected in series with a coupling capacitor between an RF throughpath and ground;

a means for switching; and a capacitor connected to said switching means, wherein said capacitor can be connected in parallel with said resonant tank circuit only when said switching means is closed.

22. The system of claim 21, wherein when said switching means is closed, the center frequency of said frequency selective notch filter is lowered by about 2 MHz.

23. The system of claim 21, wherein said switching means comprises a resistor and a diode.

* * * * *